May 25, 1937.  R. SCHLETTER  2,081,185
NARROWING MECHANISM
Filed Nov. 10, 1934  8 Sheets-Sheet 1

Fig. 1.

INVENTOR.
Richard Schletter
BY Wm. P. Smith
ATTORNEY.

May 25, 1937.    R. SCHLETTER    2,081,185
NARROWING MECHANISM
Filed Nov. 10, 1934    8 Sheets-Sheet 6

INVENTOR.
Richard Schletter
BY
ATTORNEYS.

Patented May 25, 1937

2,081,185

UNITED STATES PATENT OFFICE 2,081,185

NARROWING MECHANISM

Richard Schletter, North Wales, Pa., assignor to Walls Hosiery Company, North Wales, Pa.

Application November 10, 1934, Serial No. 752,399

15 Claims. (Cl. 66—89)

The present invention relates to a narrowing mechanism for full fashioned or flat knitting machines and, more particularly, to that type of full fashioned or flat knitting machine commonly referred to in the art as "footer". More specifically, the invention contemplates a mechanism devised to form the narrowing courses of the toe part of a full fashioned stocking in accordance with the method disclosed in my co-pending application, Serial No. 737,199, filed July 27, 1934.

The usual fashioning process carried out to shape the toe portion of a full fashioned stocking causes the formation of so-called gores having diamond points in said toe portion. For this purpose, sets of two associated narrowing fingers or combs are utilized, each consisting of an outer larger narrowing comb and an inner smaller narrowing comb, the latter corresponding in width to that of the gore to be formed in the stocking toe.

Heretofore, it has been customary through operation of the known mechanism to uniformly displace the sets of narrowing combs inwardly for a distance of two needles, resulting in transferring a distance of two wales the loops within the limits of the gore and diamond point, as well as outside the limits thereof. This transfer of the loops for a distance of two wales has the disadvantage of forming on both sides of the gores and diamond points a fashioning line which is coarse and conspicuous due to the presence of pairs of overlapping loops. Consequently, the use of heavier reinforcing threads is practically impossible because such heavy threads render the fashioning lines even coarser and still more conspicuous.

Furthermore, the transfer of loops for a distance equal to two wales causes said loops to become unduly stretched, thus weakening the structure of the fabric, and consequently increasing the possibilities of runners or dropped stitches occurring in the fabric.

Attempts have been made to overcome these inconveniences by modifying the action of the narrowing mechanism so that the same may operate to transfer the loops for a distance of one needle only. While such a narrowing method may be advantageous for fashioning the leg portion of the stocking, experience has proven the known method impractical in the proper shaping of the foot portion, particularly the toe part, because the one needle wale transfer does not sufficiently narrow the fabric at each narrowing course to correctly shape the stocking toe.

The objects of the present invention, therefore, reside in the provision of mechanisms adapted to be operatively associated with the equipment embodied in the ordinary full fashioned or flat knitting machine now in use and capable of acting differently on the two narrowing combs included in each set mounted on the "footer" so that two distinct successive narrowing operations will take place during the knitting of a single narrowing course, one narrowing operation transferring the loops a single wale distance and the other narrowing operation transferring certain of said loops an additional wale distance, whereby to reduce the number of overlapping loops in the fashioning lines demarking the gores and diamond points, thus permitting the use of relatively heavier reinforcing threads and, further, to reduce the strain on the loops, thereby practically obviating the possibilities of creating dropped stitches without, however, being detrimental to the proper shaping of the stocking toe part.

My invention is further characterized by the fact that the elimination of the pairs of overlapping loops materially reduces the size of the narrowing lines in the toe part.

Other important objects and advantages of the invention will be in part obvious and in part pointed out hereinafter.

In order that the invention and its mode of operation may be readily understood by those skilled in the art, I have, in the accompanying drawings, and in the detailed description based thereupon, set out a possible embodiment of the same.

With more particular reference to the drawings, wherein like characters of reference will designate corresponding parts throughout, it is to be understood that I have shown only those parts of a full fashioned hosiery knitting machine which are essential to the proper comprehension of the present invention, the knitting machine itself being of the usual standard construction well known in the art. Also, whereas the drawings show portions at one end of the usual knitting machine, it is to be understood that similar duplicate parts are provided at the opposite end and operate in like manner.

Figures 4, 8:
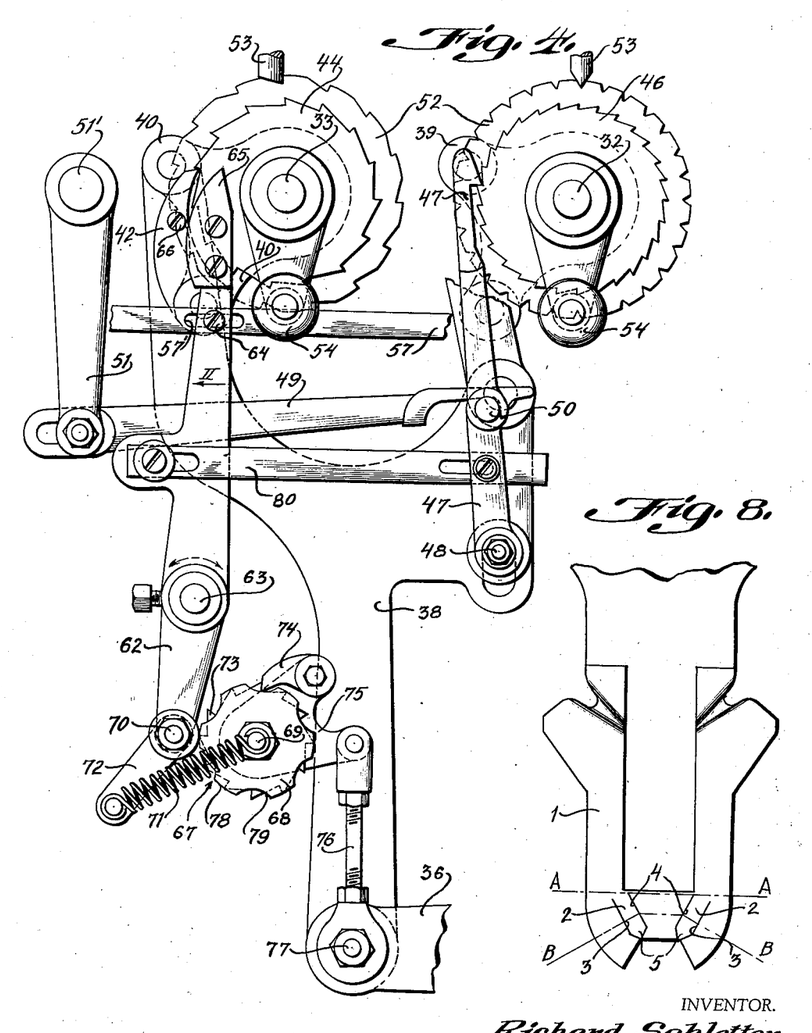
Figure 4 is an enlarged detail of a portion of the narrowing mechanism in end elevation, having certain parts broken away.
Figure 8 is a plan of the foot blank of a full fashioned stocking incorporating my invention.

Referring more particularly to Figure 8, I have diagrammatically illustrated a full fashioned stocking foot blank 1 which is provided with the gores 2 defined by the outer lines of fashioning marks 3 and the inner lines of fashioning marks 4, and terminating into the diamond points 5. In accordance with my improved method of narrowing, specifically defined in my copending application, Serial No. 737,199, the main feature of the invention resides in forming both lines 3 and 4 by a single needle narrowing operation, that is, each line of fashioning marks is produced by a row of single pairs of overlapping loops in counterdistinction to two pairs of overlapping, interengaging narrowing loops characteristic of the narrowing construction of parts of toe now in use in the manufacture of full fashioned hosiery.

Therefore, the blank 1 is knitted in the usual manner to the point where the toe part starts, that is, approximately to the point indicated by dotted lines A—A in Figure 8. From then on, the narrowing device of the "footer" is set in motion and my improved mechanism may be brought immediately in operation, although in practice, I have found that I may, and preferably do, narrow the toe fabric in the usual two needle fashion for a group of courses without any detrimental results, since the fabric area in the initial courses between the gores is of sufficient width and elasticity to counteract the stress imposed upon the stretched overlapping loops. At a portion intermediate the length of the gores 2, for instance at the point indicated by the dotted line B—B, my improved mechanism is automatically set into operation to carry on the single needle narrowing in the manner to be hereinafter more specifically set forth.

Figure 3:
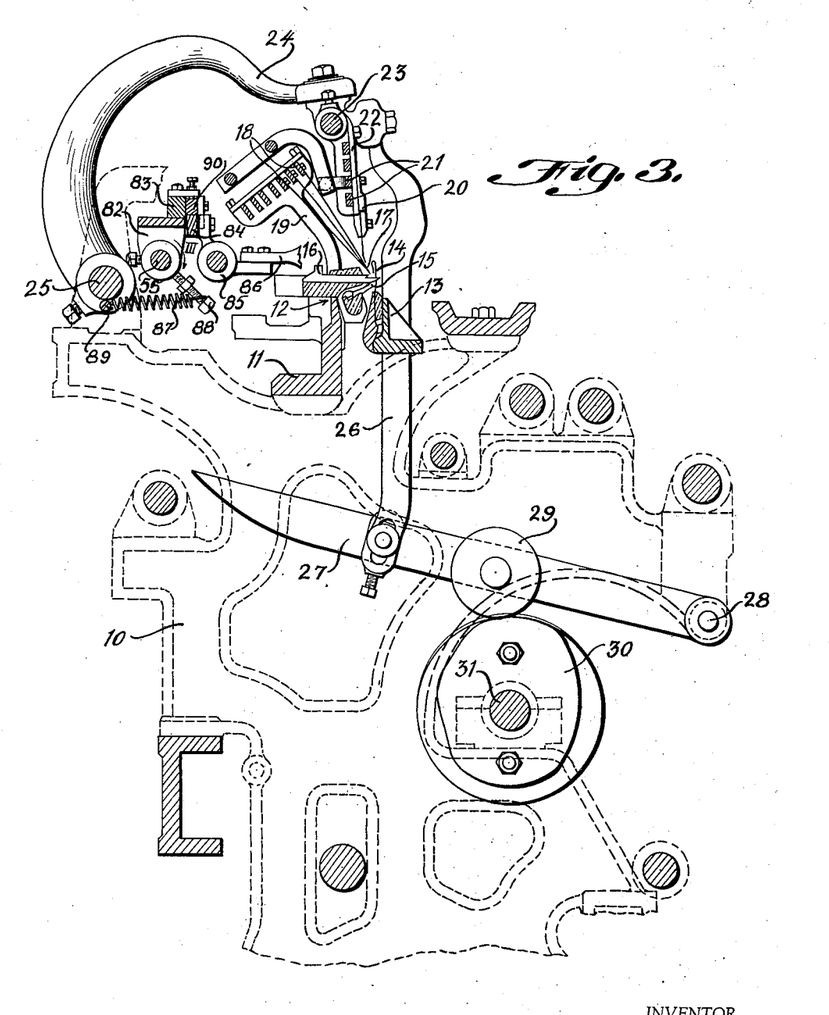
Figure 3 is a transverse sectional elevation through the flat knitting machine.

In the drawings illustrating the mechanism which I have devised for carrying my improved method aforesaid, the usual machine frame is indicated at 10 and carries the center bed 11 about which is mounted, as shown in Figure 3, the knitting section of the machine, designated in its entirety for convenience, by the reference character 12. The knitting section 12 essentially comprises the needle bar 13 carrying the needles 14, the knock-over bit 15 and the dividers 16. The thread or yarn is fed to the knitting section 12 of the machine by the carriers 17 depending from the carrier rods 18 mounted for reciprocation in the carrier rod bracket 19. The relative position, operation, and function of these various elements of the knitting section 12, as above defined, are well understood by those skilled in the art.

The narrowing mechanism of the knitting machine includes narrowing fingers or combs 20 connected to the sliding bars 21 slidably mounted in supports 22 carried by a shaft 23 suspended from an arm 24 pivoted, as represented at 25, to the rear portion of the knitting machine frame 10.

The dipping motion of the narrowing combs is effected in the usual manner by means of a vertical lever 26 having its upper extremity connected to the pivoted arm 24 and its lower extremity articulated to a substantially horizontally disposed lever 27 pivotally connected, as at 28, to the front portion of the machine frame 10 and carrying a roller 29 at a point intermediate its connection with the arm 26 and with the frame 10. The roller 29 is adapted to contact with the peripheral surface of a dipping cam 30 secured to the main cam shaft 31 of the machine.

The narrowing motion controlling the horizontal displacement of the narrowing combs and of the carrier rods is obtained, as is well known in the art, through actuation of the narrowing nut spindle 32 and the carrier rod stop nut spindle 33 which are set in operation when it is desired to decrease the width of the fabric and to vary the travel of the thread carriers accordingly.

Figure 2:
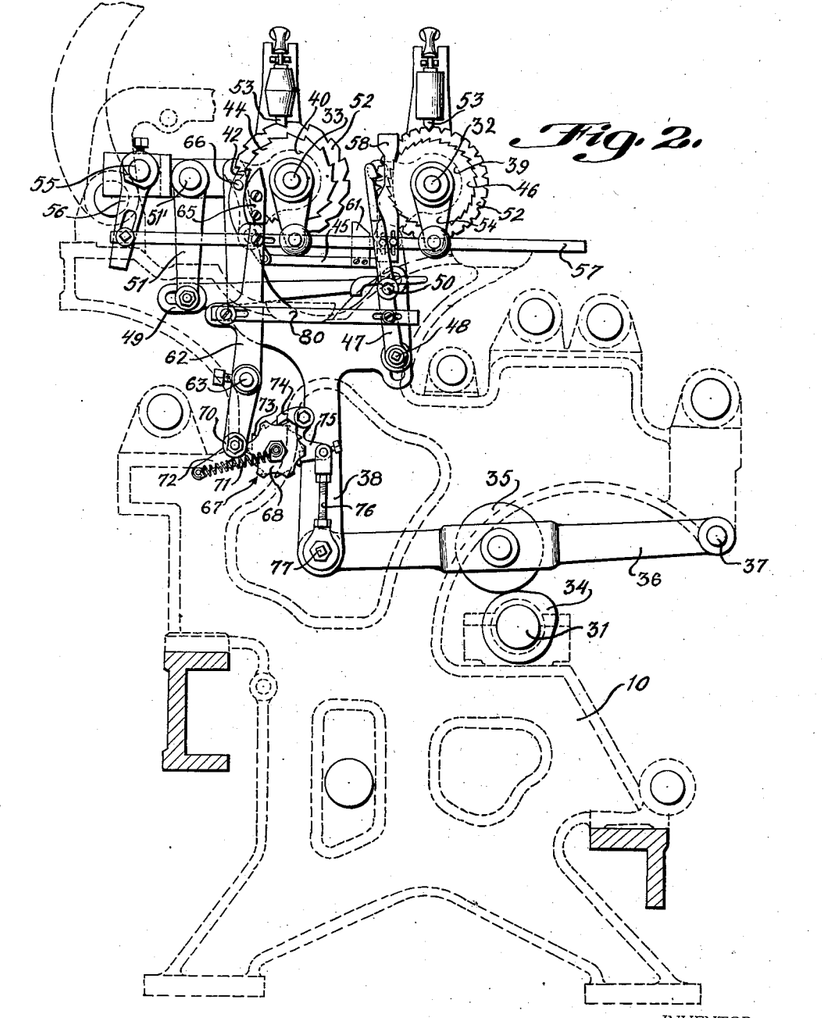
Figure 2 is an end elevation of the same.

For this purpose, as will more clearly appear from Figure 2 of the drawings, a cam 34 is mounted on the main cam shaft 31 and acts upon a roller 35 carried by a lever 36 having one of its ends pivoted as at 37 to the front portion of the machine frame 10. Connected for pivotal movement to the free extremity of the lever 36 is an upwardly directed fork member 38. The spread branches of said member 38 pivotally engage links 39 and 40 carrying pawls 41 and 42 (see Figure 5) respectively engageable with tooth ratchet wheels 43 and 44 secured to said spindles 32 and 33. The pawls 41 and 42 are connected by a link 45 having a slot 45' affording a loose connection to permit independent movement of the pawl 42.

The teeth of ratchet wheel 43 are so spaced that the racking of said wheel one tooth will cause the narrowing nut carried by the associated spindle 32 to move one needle distance, whereas the spacing of the teeth of the ratchet wheel 44 is such that the carrier rod stop nut mounted on the associated spindle 33 will be displaced at each racking for a distance of two needles. It is to be understood that in the usual narrowing operation, the pawl 41 is adapted to engage, at each actuation, every other tooth on the ratchet 43 so that the spindle 32 is rotated to advance the associated narrowing nut the distance of two needles.

The spindle 32 is further provided with an additional ratchet wheel 46 having its teeth extended in a direction opposite to that of ratchet wheel 43 and adapted to be actuated for reversely racking the spindle 32 for the distance of one needle, by means of a spring pressed pawl 47 pivoted to a convenient point upon the fork-shaped member 38 as indicated at 48. The pawl 47 is withdrawn from operative position through an arm 49 arranged for engagement with a stud 50 on said pawl, and connected to an oscillating lever 51 mounted upon the usual rock shaft 51'. Each spindle 32 and 33 is provided with the usual notched disc 52 and detent 53 cooperating to maintain the spindles in position after each racking thereof. Upon each spindle 32 and 33 is also mounted the manually operable crank 54 used to adjust the carrier stop nut and the narrowing nut on their respective spindle and to return said nuts to their original position after each narrowing operation. This mechanism and its operation are well known and accordingly need no further description.

The mechanism embodying the present invention is devised to vary the normal racking movement of the spindles and is particularly adapted to act upon the various pawls hereinbefore referred to for modifying their operation.

For this purpose, and in order to control the narrowing nut spindle pawl 41 there is suitably mounted at the rear of the machine frame 10 a rotatable stub shaft 55 having one end projecting laterally of the machine in substantial alignment with the outer extremity of the narrowing spindles 32 and 33. A downwardly directed arm 56 is rigidly fixed to the projected end of said shaft 55 and pivotally connected to a horizontally slidable bar 57 arranged to normally lay adjacent the ratchet pawls 41, 42, and 47. An upstanding blade 58 is adjustably secured to a portion of the bar 57 in the manner indicated at 59 and is disposed for engagement with a pin 60 mounted upon the pawl 41 so that in the movement of said blade in the direction indicated by the arrow I, (Figure 5), said pawl will be forced out of engagement with its cooperating ratchet wheel 43. It is to be noted that the edge of the blade 58 disposed adjacent the pin 60 carried by the narrowing nut spindle pawl 41, is formed with a recess 58' whereby, upon registration of the pin 60 with said recess 58', the pawl 41 will be permitted to fall into engagement with the ratchet 43. Because of this construction, it will be appreciated that the pawl 41 is caused to engage in succession each tooth of the ratchet 43 since the edge of the blade 58 preceding the recess 58' acts to prevent said pawl from skipping one tooth as is done in its usual action.

In order to prevent accidental contact of the pawl 41 with the racking members of the carrier nut spindle 33 when said pawl is displaced by action of the blade 58, a stop plate 61 is affixed to the pawl connecting link 45 and disposed to extend in the path of movement of said pawl 41.

Figure 5:
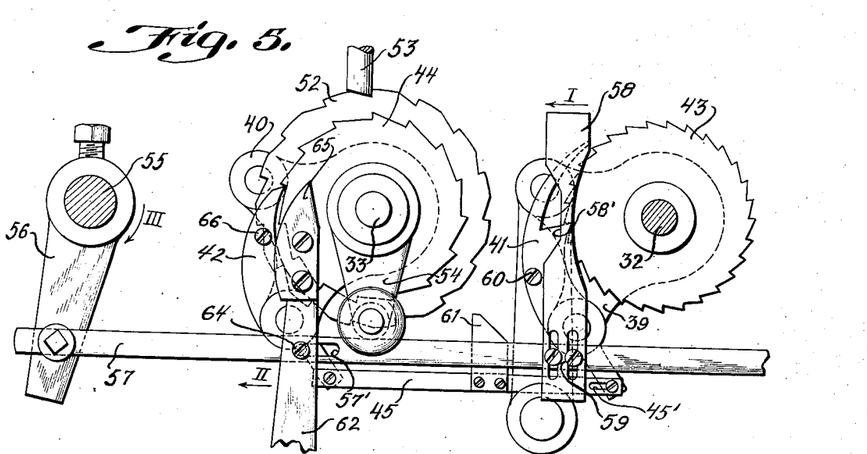
Figure 5 is a view similar to Figure 4 with certain parts removed and certain other parts broken away.
Figure 6:
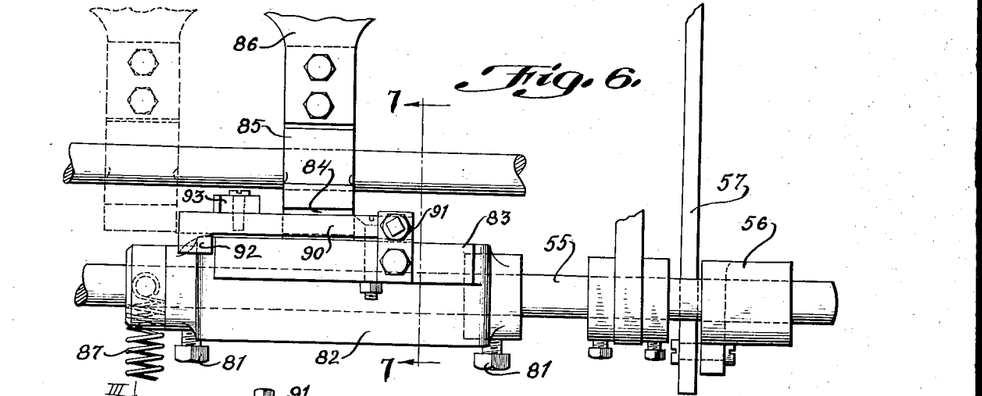
Figure 6 is an enlarged plan illustrating the details of the control mechanism embodied in my invention.
Figure 7:
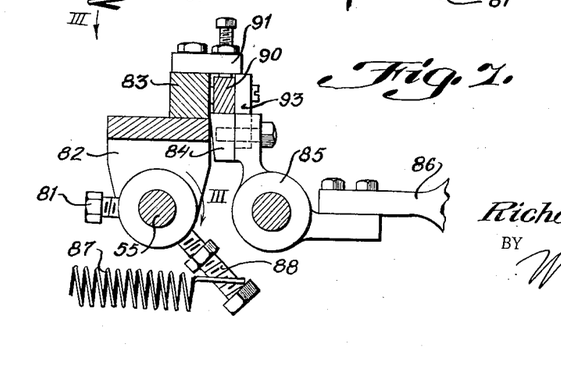
Figure 7 is a section taken on line 7—7 of Figure 6.

In order to control the stop nut spindle ratchet pawl 42, as is more clearly shown in Figures 4 and 5, a vertically disposed arm 62 is pivoted at its intermediate portion to the frame 10 by means of a pin 63. The upper end portion of said arm 62 is freely connected to the slidable bar 57 by a pin 64 and terminates with a finger 65 positioned to engage a pin 66 carried by the pawl 42 so that the movement of the arm 62 in the direction indicated by the arrow II will cause said pawl to disengage its associated ratchet wheel 44. As shown, a slot 57' is cut into the bar 57 at its point of connection with the arm 62. The position and size of the slot 57' is so determined that the rear edge thereof will bear against the pin 66 on said arm 62 when the bar 57 is in position, illustrated in Figure 5, and thus prevent said arm from moving in the direction indicated by arrow II, but when the bar 57 is displaced to the position illustrated in Figure 4, the arm 62 will be free to rock about its pivot 63.

Pivotal rocking movement is imparted to the arm 62 by means of a cam device indicated in its entirety by the reference character 67 receiving its motion through actuation of the lever 36.

The cam device 67 includes an undulated cam disc 68 rotatably supported on a pin 69 mounted upon the machine frame 10, the peripheral cam surface of said disc being disposed for engagement with a roller 70 carried by the lower extremity of the arm 62. Positive contact between the cam disc 68 and the roller 70 is assured by means of a coil spring 71 having one end connected to the cam supporting pin 69 and the other end connected to an offset extension 72 projecting from said lower extremity of the arm 62.

Rigid with the cam disc 68 for the purpose of rotating the same, is a ratchet 73 cooperatively associated with a pawl 74 carried by a support 75 freely received upon the pin 69 and pivotally connected to a link 76 which engages the lever 36 at its point of connection with the forked member 38 as represented at 77, so that, upon movement of the lever 36, the cam device will be operated in the manner and for the purpose to be hereinafter more specifically set forth.

It is to be noted that the high spots 78 and the low spots 79 of the cam disc 68 are spaced in such a manner that the distance therebetween is equal to one tooth of the ratchet 73, thus causing the lever 62 to rock in time with the dipping movement of the lever 36. The purpose of this timed action will be apparent as the description progresses. A link 80 adjustably interconnects the arm 62 and the ratchet pawl 47 of the usual narrowing mechanism, so that said pawl is thrown in and out of action with the movement of said arm.

Of preference, the means just now described for controlling the action of the pawls of the narrowing mechanism are automatically set in operation and to accomplish this, there is mounted upon the stub shaft 55 and rigidly secured thereto by means of bolts, or the like, 81, a bracket 82 carrying a guide 83 engageable with a slide block 84 fixed to the sliding bearing 85 of the carrier stop nut 86 for movement therewith. This arrangement, it will be understood, prevents rotation of the shaft 55 which is normally urged in the direction indicated by the arrow III by means of a coil spring 87 having one end suitably connected to said shaft as at 88, and the other end connected to a convenient portion of the machine frame 10 as shown at 89.

By reason of this construction, it will be appreciated that with continued advancement of the carrier stop nut 86 the slide block 84 will pass beyond the guide 83 whereupon the bracket 82 together with the shaft 55 will be free to rotate, thus automatically actuating the pawl controlling means, as hereinbefore stated.

In order to return the shaft 55 and its bracket 82 to their original position and, accordingly, reset the pawl controlling means to neutral position, a bar 90 is pivotally and adjustably secured at one end to the inner side of the bracket 82 as is indicated at 91. The free end of said bar terminates with a cam block 92 adapted to engage the slide block 84 on the sliding bearing 85 of the narrowing nut 86 when the latter is retracted through actuation of the manually operable crank 54. The engagement of said cam block 92 with its slide block 84 causes the bracket 82 to be displaced and this permits said slide block 84 to slip past the guide 83. A guiding finger 93 is mounted to project from one side of the bar 90 to assure the proper movement of the latter.

Figure 1:
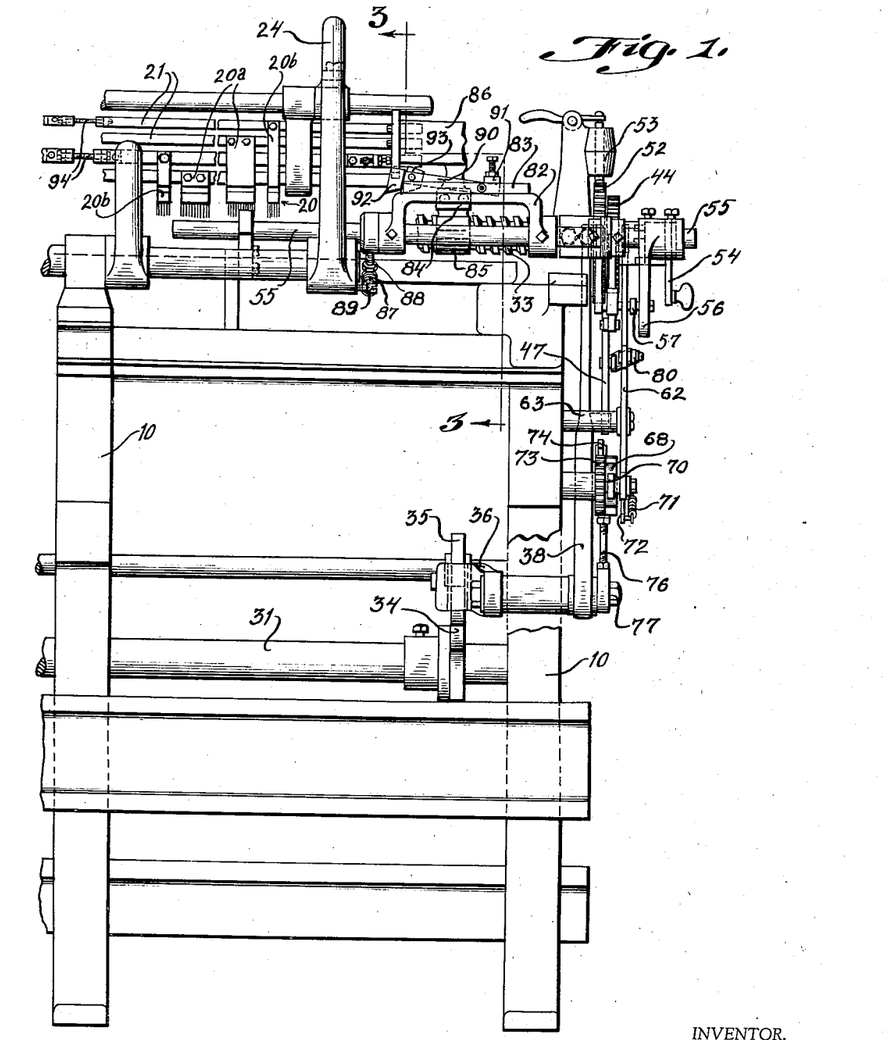
Figure 1 is a rear elevation of a portion of a flat knitting machine having my improved device attached thereto.

In the "footer" now commonly in use, there are provided in each knitting section of the machine two sets of narrowing combs or fingers 20 each set consisting of an outer larger comb 20a and an inner smaller comb 20b, Figure 1, the combs included in each section being independently supported by a separate sliding bar 21. Each sliding bar in the usual manner is divided into two parts: one part extending over one-half of the length of the machine is controlled from one end of the latter; the other part extending over the remaining half of the machine is controlled from the other end thereof.

According to the present invention, this usual arrangement is modified to the extent that the sliding bars supporting the smaller combs of one set are adapted to be controlled from one end of the machine to move over its entire length, and the sliding bars supporting the smaller combs of the remaining set are adapted to be controlled from the other end of the machine to move likewise over the entire length thereof. For this purpose, the divided sliding bars of said smaller combs 20b are united preferably by means of a connection bolt, as shown at 94.

From the foregoing, it will be understood that the operation of the narrowing mechanism is as usual so long as the pawl controlling means embodying the present invention is retained in a position of inactivity. In this position, the stub shaft 55 is held against the normal action of the spring 87 because of the engagement between the slide block 84 carried by the carrier stop nut 86 and the guide 83, the latter being supported upon the bracket 82 rigid with said shaft 55. Accordingly, the slidable bar 57 is maintained in a position to keep the blade 58 and the arm 62 away from the abutments 60 and 66 on pawls 41 and 42 respectively, so that said pawls are actuated normally through the usual motion of the narrowing mechanism to rack the ratchets 43 and 44 for rotating the spindles 32 and 33 and thus causing movement of their respective spindle nuts inwardly of the knitting machine repeated for the distance of two needles. It is to be noted that the movement of the camming device 67 has no effect on the arm 62 since the latter is held against movement due to its engagement with the bar 57.

With continued advance of the carrier stop nut 86, Figure 1, the slide block 84 will be carried out of engagement with the guide 83 whereupon the bracket 82, and the stub shaft 55 carrying the same, will be released, the moment of release being determined by the longitudinal adjustment of the bracket 82 upon the shaft 55.

Upon the freeing of said shaft, the spring 87 urges the same outwardly of the machine carrying therewith the arm 56 and the slidable bar 57 which, in turn, brings the blade 58 in contact with the abutment 60 on pawl 41 and by reason of pin 64 in slot 57', frees the arm 62 to contact with the abutment 66 on the pawl 42. Said pawls 41 and 42 are thereby forced out of engagement with their respective ratchets 43 and 44. At the same time, the arm 62 becomes free to be acted upon by the camming device 67.

In released position, my ratchet pawl controlling mechanism operates as follows: The oscillation of the lever 36 through rotation of the dipping cam 34 actuates, by means of link 76, the pawl and ratchet 73 and 74 which revolves the cam disc 68 acting upon the roller 70 to rock the arm 62 about its pivotal pin 63.

The rocking motion of the arm 62, of course, displaces the cam finger 65 thereof to and fro, for controlling the movement of the pawl 42 to operative and inoperative positions. As hereinbefore stated, the movement of the arm 62 has no effect upon the bar 57 nor upon the blade 58 because of the slot 57' provided in said bar.

The operation of the mechanism just defined changes the usual double narrowing to a single narrowing in the following manner:

In practice, the action of the arm operating cam wheel 68 is timed so that at the releasing moment of the shaft 55 a high spot 78 is opposite the roller 70, thus maintaining the finger 65 away from the pawl 42 although the blade 58 is brought immediately into action. In this position, the pawl 42 will act upon the ratchet 44 to advance the same the distance of one notch while the pawl 41 is permitted to also advance the ratchet 43 the distance of one notch only, to be subsequently racked back by actuation of the pawl 47.

The first following dipping motion of the lever 36 brings a low spot 79 of the cam disc 68 to register with the roller 70 thereby allowing the arm 62 to move to that position for disengaging the pawl 42 from the ratchet wheel 44. Consequently, at the up movement of this first dipping motion, the spindle 33 and its associated carrier stop nut will remain stationary since the pawl 42 is held away from the ratchet 44. Likewise, the spindle 32 and its associated narrowing nut will remain stationary during the initial displacement of the pawl 41 but with continued movement of the latter the pin 60 will be brought to register with recess 58' whereupon said pawl 41 will fall in engagement with the ratchet 43 to rotate the spindle 32 for advancing its associated narrowing nut the distance of one needle. The blade 58, therefore, modifies the action of the pawl 41 in that it causes the same to engage in succession each notch of the ratchet 43 instead of engaging every other notch as in the usual two needle narrowing.

At the down movement of said first dipping motion, the back racking pawl 47 will fail to act because of the connection 80 between said pawl 47 and the arm 62, which connection retracts the pawl 47 and holds the same away from the ratchet 46.

The second following dipping motion of the lever 36 brings a high spot 78 in alignment with the roller 70 thereby rocking the arm 62 to that position necessary to bring the finger 65 away from the pin 66, thus freeing the pawl 42 for engagement with the ratchet 44 and also releasing the pawl 47 for engagement with the reversely racking ratchet 46. As hereinbefore stated, the rocking movement of the arm 62 does not disturb the blade 58 which continues to maintain the pawl 41 out of engagement with the ratchet 42.

Therefore, at the up movement of said second dipping motion, the spindle 33 will be rotated to advance its associated carrier stop nut the distance of two needles and the spindle 32 will be rotated to advance its associated narrowing nut the distance of one needle in the same manner described in connection with the first dipping motion. At the down movement of said second dipping motion, the pawl 47 having been released, engages the ratchet 46 and racks back the spindle 32.

The movements imparted to the narrowing nut spindle 32 by action of its ratchet acts upon the two sets of narrowing combs or fingers 20a and 20b in the manner diagrammatically illustrated in Figures 9 to 12 inclusive.

Figure 9:
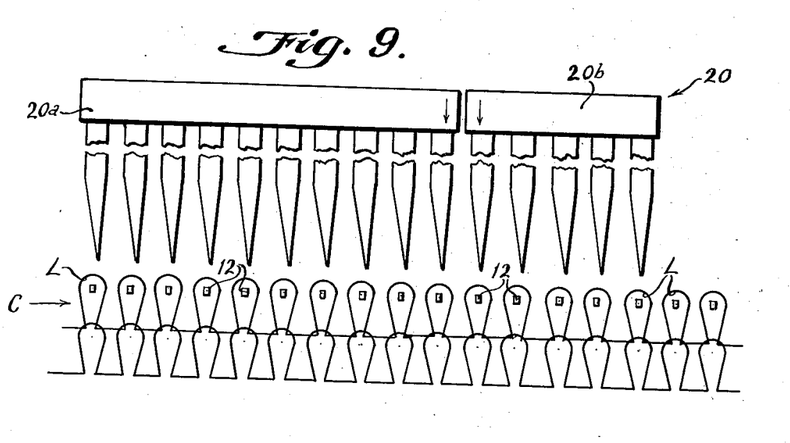
Figure 9 diagrammatically illustrates the relative position of the narrowing combs and a knitted course.

Referring to Figure 9, it will be noted that the narrowing combs 20a and 20b are associated in close relation to enable the points carried thereby to descend and engage all the loops L of the knitted course C. It will be understood that the combs descend to engage the loops through operation of the arm 26 operatively associated with the dipping cam 30 in the manner heretofore described.

Figure 10:
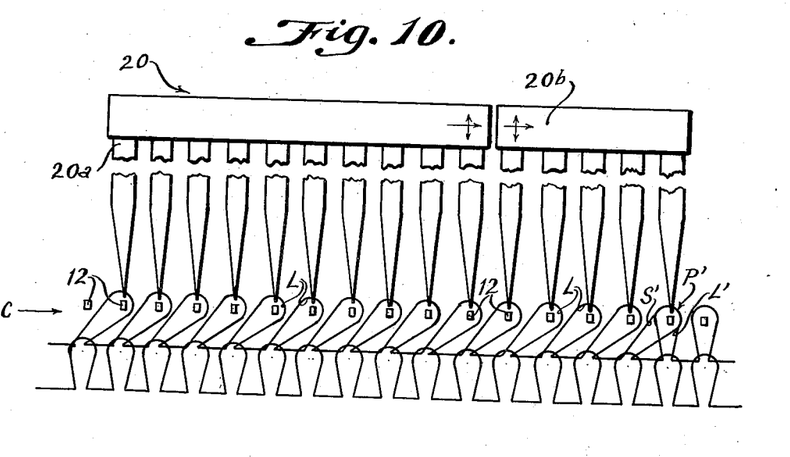
Figure 10 diagrammatically illustrates the relative position of the narrowing combs and a knitted course after the transferring of the loops a single wale distance.
Figure 11:
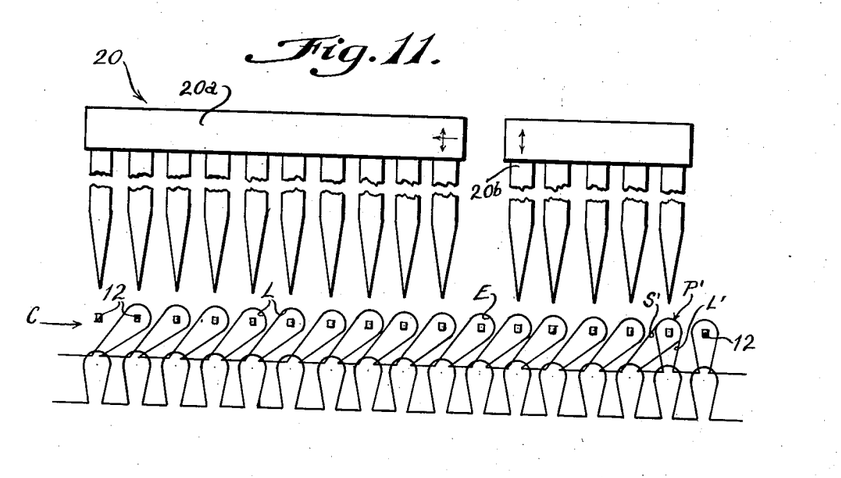
Figure 11 diagrammatically illustrates the narrowing combs in relation to each other and the transferred course when said combs are arranged to engage the narrowing course for a second narrowing operation.
Figure 12:
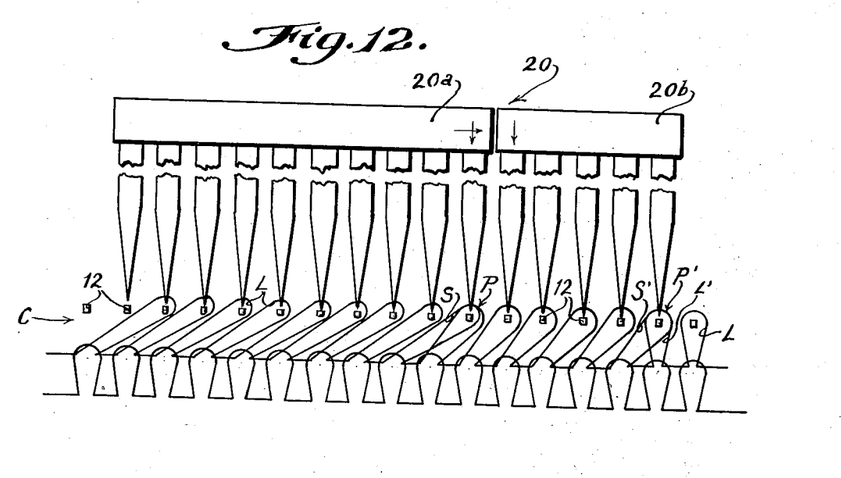
Figure 12 diagrammatically illustrates the relative position of the narrowing combs in the transferring of certain of the loops a distance of two wales.

In Figure 10, I have shown the narrowing combs 20a and 20b in the same corelation as shown in Figure 9 but transferred laterally, as a unit, a single wale distance to transfer all the loops L engaged by the points thereof a distance of a single wale onto the needles 12. When this has been accomplished, the narrowing combs 20a and 20b are raised vertically through the dipping motion aforesaid in their associated relation, whereupon the comb 20a is moved coursewise away from the comb 20b the distance of one wale, the comb 20b retaining its walewise position, as shown in Figure 11. The combs 20a and 20b then descend in this adjusted relation so that the points thereof will engage all the heretofore transferred loops with the exception of that loop disposed within the space between the separate combs, said loop being indicated in the drawings by the reference character E. The combs 20a and 20b are thereupon lifted vertically in their adjusted position with the loops connected to the points thereof. When the combs 20a and 20b have been elevated to their final position, the comb 20a is moved into its former relation with the comb 20b, as shown in Figure 12, the comb 20b retaining its former position, with the result that when both combs are simultaneously moved downwardly into a second engagement with the needles 12, certain of the loops of the transferred portion of the narrowing course C will be transferred a distance of two wales while the remaining transferred loops of said course will be transferred to a position corresponding to one wale distance only.

By proceeding in this manner, a single loop S is deposited onto a single loop L for providing a single pair P of transferred, overlapping loops, forming the outer narrowing line 3, while a single overlapping loop S' is deposited onto a single loop L' to provide a pair of overlapping loops P' forming the inner narrowing line 6.

I wish to call attention to the fact that each narrowing course includes two series of transferred loops, the loops of one series, that is, the loops within the gore 2 and diamond point 5 are transferred for a one wale distance only, whereas the loops of the remaining series, that is, the loops on the outside of the gore 1 and diamond point 4 are transferred a two wale distance.

The corelative action between the narrowing nut spindle operating mechanism and the sets of narrowing combs or fingers is as follows:—

Figure 13:
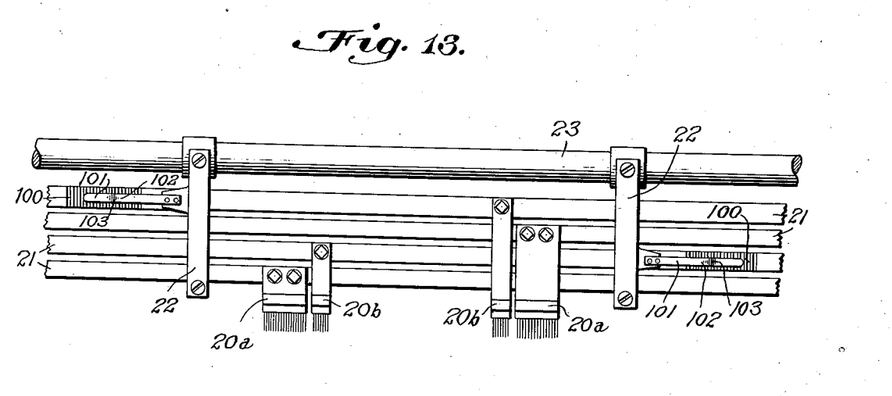
Figure 13 is an enlarged detail in face elevation, illustrating the means provided on a full fashioned knitting machine to lock the bars carrying the small narrowing combs.
Figure 14:
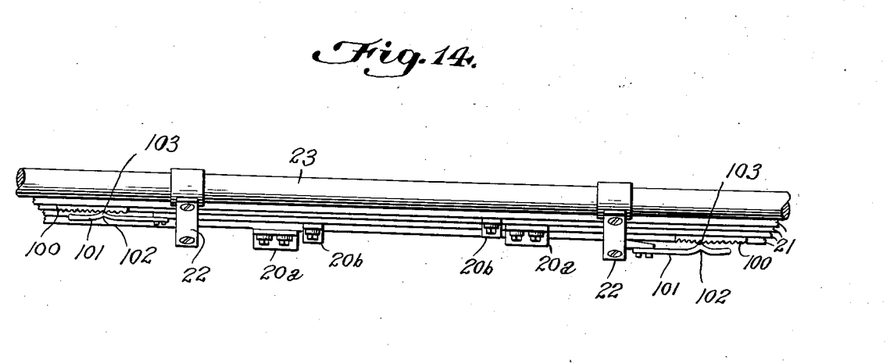
Figure 14 is a top plan of the same.

As previously stated, immediately upon release of my improved device, the spindle 32 is rotated to advance its associated narrowing nut the distance of one needle. This permits the larger narrowing fingers 20a to move inwardly, carrying therewith the smaller narrowing fingers 20b to transfer all the loops the distance of one wale, as shown in Figure 10. The smaller narrowing fingers 20b are then locked in position through the usual means provided upon the machine for that purpose. The preferred and most used form of locking means is that provided on the "Reading" full fashioned knitting machine and the parts constituting such means are shown and described on pages 151–152 of the Reading Catalogue, copyrighted 1929 by Textile Machine Works of Reading, Pennsylvania. In Figures 13 and 14, I have illustrated this commonly known locking means mounted for operation on the knitting machine. From these figures, it will appear that a ratchet plate 100 is affixed to each of the sliding bars 21 carrying the small narrowing combs 20b and that a spring blade 101 is fixedly secured to a portion of the bar supporting brackets 22 and disposed thereon to extend over each ratchet plate 100. The intermediate portion of each spring blade 101 is kinked, as shown at 102, to provide an angular protuberance 103 projecting in the path of the associated ratchet plate 100 and engaging the teeth of the latter. In this manner, it will be appreciated that the bars 21 carrying the small combs 20b are yieldably held in their adjusted positions during the narrowing operation due to the spring blades 101 which constantly bear upon the ratchet plates with sufficient pressure to prevent accidental displacement of the bars but allow the sliding movement of the latter by riding over the teeth of the ratchet plates when the bars are forced by actuation of the narrowing mechanism in the manner hereinbefore stated. The racking back of the narrowing nut spindle 32 allows the larger narrowing fingers 20a to move outwardly and away from the locked smaller narrowing fingers 20b for a one wale distance, as shown in Figure 11, so that with the next forward movement of the narrowing nut spindle, said larger narrowing fingers 20a will transfer those loops engaged thereby the distance of an additional wale, as represented in Figure 12. At this last mentioned movement of the narrowing nut spindle 32 the same will not be racked back but will remain in position since by that time the pawl 47 will have been retracted through the rocked motion of the arm 62, and the corresponding movement of the connecting link 80. Because of this, it will be understood that the parts are in readiness to repeat the cycle of operation above defined.

The action of the arm 62 throwing the pawl 42 out of operation at every other dipping motion, it will be appreciated, is for the purpose of displacing the carrier stop nut for limiting the reciprocating movement of the thread carrier rods in accordance with the one needle narrowing motion imparted to the narrowing nut in the manner hereinbefore specified.

I wish it to be understood that the showing made and the detailed description explaining the same only indicate the preferred embodiment of the invention and that the construction shown and described is capable of many modifications. Consequently, I consider within the spirit of the invention those modifications which come within the scope of the subjoined claims.

What I claim is:

1. In combination with the narrowing mechanism of a full fashioned footer knitting machine having a pair of narrowing combs corelated to form a toe gore in the foot of a full fashioned stocking; mechanism operatively associated therewith whereby the two combs will be simultaneously given a single needle narrowing motion, then one of said combs retracted the distance of a single needle and subsequently advanced a single needle distance while the other comb remains stationary.

2. In combination with the narrowing mechanism of a full fashioned footer knitting machine having a large narrowing comb and a small narrowing comb, mechanism operatively associated therewith whereby the two combs will be simultaneously given a single needle narrowing motion, then said large comb retracted a single needle distance and subsequently advanced a single needle distance while said small comb remains stationary.

3. In combination with the narrowing mechanism of a full fashioned footer knitting machine having sets of two associated narrowing combs and a narrowing nut spindle operating to actuate said combs, means acting upon the narrowing nut spindle to rotate the same in one direction whereby to simultaneously advance both of said combs for a one needle distance and other means also acting upon the narrowing nut spindle to rotate the same in reverse direction whereby to retract one of said combs for a one needle distance independently of the remaining comb.

4. In combination with the narrowing mechanism of a full fashioned footer knitting machine having two sets of associated narrowing combs arranged in inner and outer relation and a narrowing nut spindle operating to actuate said combs, means acting upon the narrowing nut spindle to rotate the same in one direction whereby to simultaneously advance both of said combs for a one needle distance and other means acting upon the narrowing nut spindle to rotate the same in reverse direction whereby to retract the outer comb for a one needle distance independently of the inner comb.

5. In a full fashioned footer knitting machine having a narrowing nut spindle ratchet, and a pawl associated therewith for normally performing a two needle narrowing operation: a mechanism for changing the two needle narrowing to a one needle narrowing operation comprising a bar mounted for horizontal displacement adjacent the narrowing nut spindle ratchet and pawl; a guiding element carried by said bar and adapted upon movement of the latter in one direction to be brought into contact with the pawl for urging the same out of engagement with its associated ratchet during the initial operative movement of said pawl; said element having means allowing the pawl, during the continued operative movement thereof, to fall into engagement with the ratchet.

6. In a full fashioned footer knitting machine having a narrowing nut spindle ratchet, and a pawl associated therewith for normally performing a two needle narrowing operation: a mechanism for changing the two needle narrowing to a one needle narrowing operation comprising a bar mounted for horizontal displacement adjacent the narrowing nut spindle ratchet and pawl; means under control of the knitting machine for automatically moving said bar into active position a guiding element carried by said bar and adapted upon movement of the latter into active position to be brought into contact with the pawl for urging the same out of engagement with its associated ratchet during the initial operative movement of said pawl; said element having means allowing the pawl, during the continued operative movement thereof, to fall into engagement with the ratchet.

7. In a full fashioned footer knitting machine having a narrowing nut spindle ratchet and a pawl associated therewith for normally performing a two needle narrowing operation: a device for changing the two needle narrowing to a one needle narrowing operation comprising a bar mounted for horizontal displacement adjacent the narrowing nut spindle ratchet and pawl; a blade upstanding from said bar and adapted upon movement of the latter in one direction to be brought into contact with the pawl for urging the same out of engagement with its associated ratchet during the initial operative movement of said pawl, said blade having a recess so disposed thereon that the pawl, during continued operative movement thereof, will come to register with the recess and thus become free to fall into engagement with the ratchet.

8. In a full fashioned footer knitting machine having a narrowing nut spindle ratchet, and a pawl associated therewith for normally performing a two needle narrowing operation: a device for changing the two needle narrowing to a one needle narrowing operation comprising a bar mounted for horizontal displacement adjacent the narrowing nut spindle ratchet and pawl; means under control of the knitting machine for automatically moving said bar into active position; a blade upstanding from said bar and adapted, upon movement of the latter into active position, to be brought into contact with the pawl for urging the same out of engagement with its associated ratchet during the initial operative movement of said pawl, said blade having a recess so disposed thereon that the pawl, during continued operative movement thereof, will come to register with the recess and thus become free to fall into engagement with the ratchet.

9. In a full fashioned footer knitting machine having a narrowing nut spindle ratchet, a carrier stop nut spindle ratchet, and pawls associated therewith for normally performing a two needle narrowing operation; a mechanism operable for changing from the two needle narrowing to a one needle narrowing operation comprising: a bar mounted for horizontal displacement; a guiding element carried by said bar and adapted upon movement of the latter in one direction to contact with the narrowing nut spindle ratchet pawl for urging the same out of engagement with its associated ratchet; a pivoted arm disposed for contact with the carrier stop nut spindle ratchet pawl; means acting upon said arm to impart a rocking motion thereto for alternatively moving the same in and out of contact with the carrier nut ratchet pawl whereby to alternatively carry the latter in and out of engagement with said carrier stop nut ratchet during the one needle narrowing operation; and means between said horizontally displaceable bar and pivoted arm adapted to lock the latter away from the carrier stop nut spindle ratchet and against the action of said rocking motion imparting means prior to the movement of said bar in the mentioned direction.

10. In a full fashioned footer knitting machine having a narrowing nut spindle ratchet, a carrier stop nut spindle ratchet, and pawls associated therewith for normally performing a two needle narrowing operation; a mechanism operable for changing from the two needle narrowing to a one needle narrowing operation comprising: a bar mounted for horizontal displacement; a guiding element carried by said bar and adapted upon movement of the latter in one direction to contact with the narrowing nut spindle ratchet pawl for urging the same out of engagement with its associated ratchet; a pivoted arm disposed for contact with the carrier stop nut spindle ratchet pawl; a cam device acting upon said arm to impart a rocking motion thereto, for alternatively moving the same in and out of contact with the carrier stop nut ratchet pawl whereby to alternatively carry the latter in and out of engagement with said carrier stop nut ratchet during the one needle narrowing operation; and means between said horizontally displaceable bar and pivoted arm adapted to lock the latter away from the carrier stop nut spindle ratchet and against the action of said cam device prior to the movement of said bar in the mentioned direction.

11. A method of narrowing a course of loops of a full fashioned knitted toe fabric by means of associated large and small narrowing combs, the small narrowing combs being adapted to form toe gores in said fabric, consisting in first moving said combs simultaneously into engagement with certain loops of the courses and simultaneously transferring said certain loops a single wale distance; then moving the combs simultaneously out of engagement with the transfer loops; then moving said large narrowing comb away from the small narrowing comb independently and then moving the narrowing combs into engagement with the previously transferred loops; and finally moving the large narrowing comb to a second narrowing position independently of the small narrowing comb whereby the loops finaly engaged by the large narrowing comb will be transferred a distance of two wales and the loops engaged by the small narrowing comb will be transferred a distance of a single wale.

12. A method of narrowing a course of loops of a full fashioned knitted toe fabric by means of associated large and small narrowing combs, the small narrowing combs being adapted to form toe gores in said fabric, comprising transferring one wale distance all the loops in those portions of the fabric courses to be narrowed by moving simultaneously the two associated combs for a distance of one needle and subsequently transferring certain of said loops an additional one wale distance by retracting the large comb and then advancing the same for a distance of one needle while maintaining the small comb stationary.

13. A method of narrowing a course of loops of a full fashioned knitted toe fabric by means of a pair of combs co-related for engaging and transferring the knitted loops to form a toe gore in said fabric, consisting in first moving the two combs simultaneously for a distance of one needle to transfer the loops a single wale distance, then retracting one of the combs the distance of a single needle and subsequently advancing the same comb a single needle distance to transfer the loops engaged thereby an additional needle distance while the other comb and the loops associated therewith remain stationary.

14. In combination with the narrowing mechanism of a full fashioned footer knitting machine having a pair of narrowing combs correlated to form a toe gore in the foot of a full fashioned stocking, mechanism operatively associated with said combs and capable of actuating the same to perform two different narrowing operations, one operation causing the actuation of the combs to accomplish a normal double needle narrowing, and the other operation causing the actuation of the two combs to accomplish a single needle narrowing by first moving the two combs simultaneously for the distance of one needle, then retracting one of the combs the distance of a single needle and subsequently advancing the same comb the distance of a single needle while the other comb remains stationary, and means operatively associated with said mechanism for controlling the same to selectively function for either of the aforesaid operations.

15. In combination with the narrowing mechanism of a full fashioned footer knitting machine having a pair of narrowing combs correlated to form a toe gore in the foot of a full fashioned stocking, mechanism operatively associated with said combs and capable of actuating the same to perform two different narrowing operations, one operation causing the actuation of the combs to accomplish a normal double needle narrowing, and the other operation causing the actuation of the two combs to accomplish a single needle narrowing by first moving the two combs simultaneously for the distance of one needle, then retracting one of the combs the distance of a single needle and subsequently advancing the same comb the distance of a single needle while the other comb remains stationary; and means operatively associated with said mechanism for controlling the same to selectively function for either of the aforesaid operations, said means consisting of a link system under control of the knitting machine and connected to said mechanism whereby the latter may be automatically acted upon to effect the change from the double needle narrowing to the single needle narrowing operation at a predetermined point during the function of the knitting machine.

RICHARD SCHLETTER.